(12) United States Patent
Faller

(10) Patent No.: US 7,116,787 B2
(45) Date of Patent: Oct. 3, 2006

(54) PERCEPTUAL SYNTHESIS OF AUDITORY SCENES

(75) Inventor: Christof Faller, Murray Hill, NJ (US)

(73) Assignee: Agere Systems Inc., Allentown, PA (US)

( * ) Notice: Subject to any disclaimer, the term of this patent is extended or adjusted under 35 U.S.C. 154(b) by 684 days.

(21) Appl. No.: 09/848,877

(22) Filed: May 4, 2001

(65) Prior Publication Data

US 2003/0026441 A1 Feb. 6, 2003

(51) Int. Cl.
H04R 5/00 (2006.01)

(52) U.S. Cl. .................. 381/17; 381/98; 379/202.01; 379/206.01

(58) Field of Classification Search .............. 381/17, 381/92, 98, 103; 379/202.01, 206.01
See application file for complete search history.

(56) References Cited

U.S. PATENT DOCUMENTS

| | | | |
|---|---|---|---|
| 5,583,962 A | 12/1996 | Davis et al. ............... 395/2.38 |
| 5,682,461 A | 10/1997 | Silzle et al. ............... 395/2.14 |
| 5,703,999 A | 12/1997 | Herre et al. ............... 395/2.12 |
| 5,771,295 A | 6/1998 | Waller, Jr. ................... 381/18 |
| 5,812,971 A | 9/1998 | Herre .......................... 704/230 |
| 5,825,776 A | 10/1998 | Moon .......................... 370/437 |
| 5,878,080 A | 3/1999 | Ten Kate ..................... 375/241 |
| 5,889,843 A * | 3/1999 | Singer et al. ............ 379/202.01 |
| 5,930,733 A | 7/1999 | Park et al. ..................... 702/76 |
| 6,016,473 A | 1/2000 | Dolby ........................ 704/500 |
| 6,111,958 A * | 8/2000 | Maher ......................... 381/17 |
| 6,236,731 B1 | 5/2001 | Brennan et al. ............ 381/316 |
| 6,539,357 B1 | 3/2003 | Sinha ..................... 704/270.1 |
| 6,763,115 B1 * | 7/2004 | Kobayashi ................. 381/309 |
| 6,823,018 B1 | 11/2004 | Jafarkhani et al. .......... 375/245 |
| 6,845,163 B1 * | 1/2005 | Johnston et al. ............ 381/92 |
| 6,850,496 B1 * | 2/2005 | Knappe et al. ............. 370/260 |
| 6,973,184 B1 | 12/2005 | Shaffer et al. ......... 379/420.01 |
| 2003/0081115 A1 * | 5/2003 | Curry et al. ............. 348/14.12 |
| 2003/0187663 A1 | 10/2003 | Truman et al. ............. 704/500 |

(Continued)

FOREIGN PATENT DOCUMENTS

EP 1 376 538 A1 1/2004

(Continued)

OTHER PUBLICATIONS

"3D Audio and Acoustic Environment Modeling" by William G. Gardner, HeadWize Technical Paper, Jan. 2001, pp. 1-11.

(Continued)

*Primary Examiner*—Brian T. Pendleton

(57) ABSTRACT

An auditory scene is synthesized by applying two or more different sets of one or more spatial parameters (e.g., an inter-ear level difference (ILD), inter-ear time difference (ITD), and/or head-related transfer function (HRTF)) to two or more different frequency bands of a combined audio signal, where each different frequency band is treated as if it corresponded to a single audio source in the auditory scene. In one embodiment, the combined audio signal corresponds to the combination of two or more different source signals, where each different frequency band corresponds to a region of the combined audio signal in which one of the source signals dominates the others. In this embodiment, the different sets of spatial parameters are applied to synthesize an auditory scene comprising the different source signals. In another embodiment, the combined audio signal corresponds to the combination of the left and right audio signals of a binaural signal corresponding to an input auditory scene. In this embodiment, the different sets of spatial parameters are applied to reconstruct the input auditory scene. In either case, transmission bandwidth requirements are reduced by reducing to one the number of different audio signals that need to be transmitted to a receiver configured to synthesize/reconstruct the auditory scene.

48 Claims, 6 Drawing Sheets

U.S. PATENT DOCUMENTS

2004/0091118 A1    5/2004    Griesinger .................. 381/20

FOREIGN PATENT DOCUMENTS

| JP | 07123008 | 5/1995 |
|---|---|---|
| WO | WO 03/090207 A1 | 10/2003 |
| WO | WO 2004/008806 A1 | 1/2004 |
| WO | WO 2004/086817 A2 | 10/2004 |

OTHER PUBLICATIONS

"Responding to One of Two Simultaneous Message", Walter Spieth et al., The Journal of the Acoustical Society of America, vol. 26, No. 3, May 1954, pp. 391-396.

"A Speech Corpus for Multitalker Communications Research", by Robert S. Bolia, et al., J. Acoust. Soc., Am., vol. 107, No. 2, Feb. 2000, pp. 1065-1066.

"Synthesized Stereo Combined with Acoustic Echo Cancellation for Desktop Conferencing", by Jacob Benesty et al., Bell Labs Technical Journal, Jul.-Sep. 1998, pp. 148-158.

"The Role of Perceived Spatial Separation in the Unmasking of Speech", by Richard Freyman et al., J. Acoust. Soc., Am., vol. 106, No. 6, Dec. 1999.

"Binaural Cue Coding Applied to Stereo and Multi-Channel Audio Compression," by Christof Faller et al., Audio Engineering Society 112$^{th}$ Covention, Munich, Germany, vol. 112, No. 5574, May 10, 2002, pp. 1-9.

"Advances in Parametric Coding for High-Quality Audio," by Erik Schuijers et al., Audio Engineering Society Convention Paper 5852, 114$^{th}$ Convention, Amsterdam, The Netherlands, Mar. 22-25, 2003, pp. 1-11.

"Advances in Parametric Coding for High-Quality Audio," by E.G.P. Schuijers et al., Proc. 1$^{th}$ IEEE Benelux Workshop on Model Based Processing and Coding of Audio (MPCA-2002), Leuven, Belgium, Nov. 15, 2002, pp. 73-79, XP001156065.

"Improving Audio Codecs by Noise Substitution," by Donald Schulz, Journal of the Audio Engineering Society, vol. 44, No. 7/8, Jul./Aug. 1996, pp. 593-598, XP000733647.

"The Reference Model Architecture for MPEG Spatial Audio Coding," by Juergen Herre et al., Audio Engineering Society Convention Paper 6447, 118$^{th}$ Convention, May 28-31, 2005, Barcelona, Spain, pp. 1-13, XP009059973.

"From Joint Stereo to Spatial Audio Coding —Recent Progress and Standardization," by Jurgen Herre, Proc. of the 7$^{th}$ Int. Conference on Digital Audio Effects (DAFx' 04), Oct. 5-8, 2004, Naples, Italy, XP002367849.

"Parametric Coding of Spatial Audio," by Christof Faller, Proc. of the 7$^{th}$ Int. Conference on Digital Audio Effects (DAFx' 04), Oct. 5-8, 2004, Naples, Itlay, XP002367850.

"Final text for DIS 11172-1 (rev. 2)," Section 3: Audio, XP-002083108, p. 244.

* cited by examiner

PERCEPTUAL SYNTHESIS OF AUDITORY SCENES

BACKGROUND OF THE INVENTION

1. Field of the Invention

The present invention relates to the synthesis of auditory scenes, that is, the generation of audio signals to produce the perception that the audio signals are generated by one or more different audio sources located at different positions relative to the listener.

2. Description of the Related Art

When a person hears an audio signal (i.e., sounds) generated by a particular audio source, the audio signal will typically arrive at the person's left and right ears at two different times and with two different audio (e.g., decibel) levels, where those different times and levels are functions of the differences in the paths through which the audio signal travels to reach the left and right ears, respectively. The person's brain interprets these differences in time and level to give the person the perception that the received audio signal is being generated by an audio source located at a particular position (e.g., direction and distance) relative to the person. An auditory scene is the net effect of a person simultaneously hearing audio signals generated by one or more different audio sources located at one or more different positions relative to the person.

The existence of this processing by the brain can be used to synthesize auditory scenes, where audio signals from one or more different audio sources are purposefully modified to generate left and right audio signals that give the perception that the different audio sources are located at different positions relative to the listener.

FIG. 1 shows a high-level block diagram of conventional binaural signal synthesizer 100, which converts a single audio source signal (e.g., a mono signal) into the left and right audio signals of a binaural signal, where a binaural signal is defined to be the two signals received at the eardrums of a listener. In addition to the audio source signal, synthesizer 100 receives a set of spatial parameters corresponding to the desired position of the audio source relative to the listener. In typical implementations, the set of spatial parameters comprises an interaural level difference (ILD) value (which identifies the difference in audio level between the left and right audio signals as received at the left and right ears, respectively) and an interaural time delay (ITD) value (which identifies the difference in time of arrival between the left and right audio signals as received at the left and right ears, respectively). In addition or as an alternative, some synthesis techniques involve the modeling of a direction-dependent transfer function for sound from the signal source to the eardrums, also referred to as the head-related transfer function (HRTF). See, e.g., J. Blauert, *The Psychophysics of Human Sound Localization*, MIT Press, 1983, the teachings of which are incorporated herein by reference.

Using binaural signal synthesizer 100 of FIG. 1, the mono audio signal generated by a single sound source can be processed such that, when listened to over headphones, the sound source is spatially placed by applying an appropriate set of spatial parameters (e.g., ILD, ITD, and/or HRTF) to generate the audio signal for each ear. See, e.g., D. R. Begault, *3-D Sound for Virtual Reality and Multimedia*, Academic Press, Cambridge, Mass., 1994.

Binaural signal synthesizer 100 of FIG. 1 generates the simplest type of auditory scenes: those having a single audio source positioned relative to the listener. More complex auditory scenes comprising two or more audio sources located at different positions relative to the listener can be generated using an auditory scene synthesizer that is essentially implemented using multiple instances of binaural signal synthesizer, where each binaural signal synthesizer instance generates the binaural signal corresponding to a different audio source. Since each different audio source has a different location relative to the listener, a different set of spatial parameters used to generate the binaural audio signal for each different audio source.

FIG. 2 shows a high-level block diagram of conventional auditory scene synthesizer 200, which converts a plurality of audio source signals (e.g., a plurality of mono signals) into the left and right audio signals of a single combined binaural signal, using a different set of spatial parameters for each different audio source. The left audio signals are then combined (e.g., by simple addition) to generate the left audio signal for the resulting auditory scene, and similarly for the right.

One of the applications for auditory scene synthesis is in conferencing. Assume, for example, a desktop conference with multiple participants, each of whom is sitting in front of his or her own personal computer (PC) in a different city. In addition to a PC monitor, each participant's PC is equipped with (1) a microphone that generates a mono audio source signal corresponding to that participant's contribution to the audio portion of the conference and (2) a set of headphones for playing that audio portion. Displayed on each participant's PC monitor is the image of a conference table as viewed from the perspective of a person sitting at one end of the table. Displayed at different locations around the table are real-time video images of the other conference participants.

In a conventional mono conferencing system, a server combines the mono signals from all of the participants into a single combined mono signal that is transmitted back to each participant. In order to make more realistic the perception for each participant that he or she is sitting around an actual conference table in a room with the other participants, the server can implement an auditory scene synthesizer, such as synthesizer 200 of FIG. 2, that applies an appropriate set of spatial parameters to the mono audio signal from each different participant and then combines the different left and right audio signals to generate left and right audio signals of a single combined binaural signal for the auditory scene. The left and right audio signals for this combined binaural signal are then transmitted to each participant. One of the problems with such conventional stereo conferencing systems relates to transmission bandwidth, since the server has to transmit a left audio signal and a right audio signal to each conference participant.

SUMMARY OF THE INVENTION

The present invention is directed to a technique for synthesizing auditory scenes that addresses the transmission bandwidth problem of the prior art. According to the present invention, an auditory scene corresponding to multiple audio sources located at different positions relative to the listener is synthesized from a single combined (e.g., mono) audio signal. As such, in the case of the conference described previously, a solution can be implemented in which each participant's PC receives only a single mono audio signal corresponding to a combination of the mono audio source signals from all of the participants.

The present invention is based on an assumption that, for those frequency bands in which the energy of the source signal from a particular audio source dominates the energies of all other source signals in the combined audio signal, from the perspective of the perception by the listener, the combined audio signal can be treated as if it corresponded solely to that particular audio source. According to implementations of the present invention, different sets of spatial parameters (corresponding to different audio sources) are applied to different frequency bands in the combined audio signal where different audio sources dominate, to synthesize an auditory scene.

In one embodiment, the present invention is a method for synthesizing an auditory scene, comprising the steps of (a) dividing an input audio signal into a plurality of different frequency bands; and (b) applying two or more different sets of one or more spatial parameters to two or more of the different frequency bands in the input audio signal to generate two or more synthesized audio signals of the auditory scene, wherein for each of the two or more different frequency bands, the corresponding set of one or more spatial parameters is applied to the input audio signal as if the input audio signal corresponded to a single audio source in the auditory scene.

In another embodiment, the present invention is an apparatus for synthesizing an auditory scene, comprising (1) an auditory scene synthesizer configured to (a) divide an input audio signal into a plurality of different frequency bands; and (b) apply two or more different sets of one or more spatial parameters to two or more of the different frequency bands in the input audio signal to generate two or more synthesized audio signals of the auditory scene, wherein for each of the two or more different frequency bands, the corresponding set of one or more spatial parameters is applied to the input audio signal as if the input audio signal corresponded to a single audio source in the auditory scene; and (2) one or more inverse time-frequency transformers configured to convert the two or more synthesized audio signals from a frequency domain into a time domain.

In yet another embodiment, the present invention is a method for processing two or more input audio signals, comprising the steps of (a) converting the two or more input audio signals from a time domain into a frequency domain; (b) generating a set of one or more auditory scene parameters for each of two or more different frequency bands in the two or more converted input audio signals, where each set of one or more auditory scene parameters is generated as if the corresponding frequency band corresponded to a single audio source in an auditory scene; and (c) combining the two or more input audio signals to generate a combined audio signal.

In yet another embodiment, the present invention is an apparatus for processing two or more input audio signals, comprising (a) a time-frequency transformer configured to convert the two or more input audio signals from a time domain into a frequency domain; (b) an auditory scene parameter generator configure to generate a set of one or more auditory scene parameters for each of two or more different frequency bands in the two or more converted input audio signals, where each set of one or more auditory scene parameters is generated as if the corresponding frequency band corresponded to a single audio source in an auditory scene; and (c) a combiner configured to combine the two or more input audio signals to generate a combined audio signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
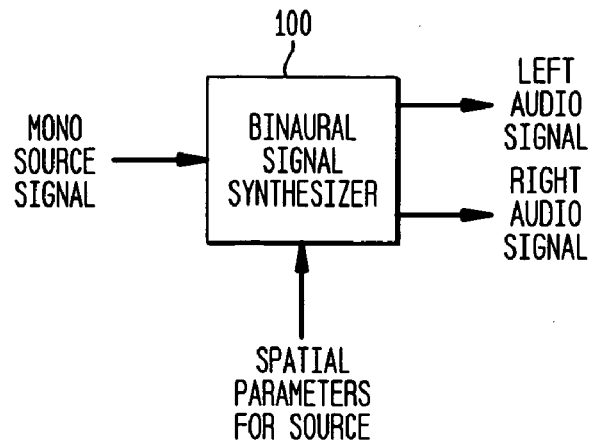
FIG. 1 shows a high-level block diagram of conventional binaural signal synthesizer that converts a single audio source signal (e.g., a mono signal) into the left and right audio signals of a binaural signal.
Figure 2:
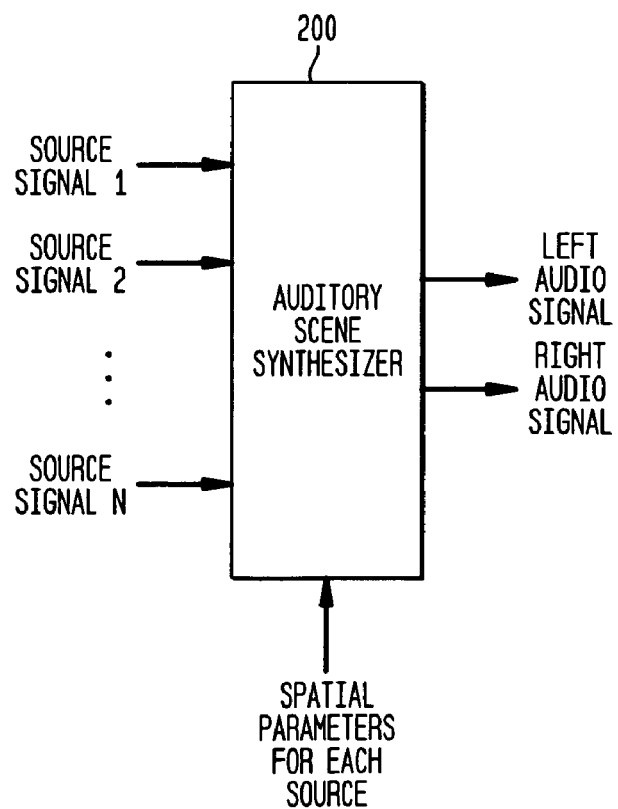
FIG. 2 shows a high-level block diagram of conventional auditory scene synthesizer that converts a plurality of audio source signals (e.g., a plurality of mono signals) into the left and right audio signals of a single combined binaural signal.
Figure 3:
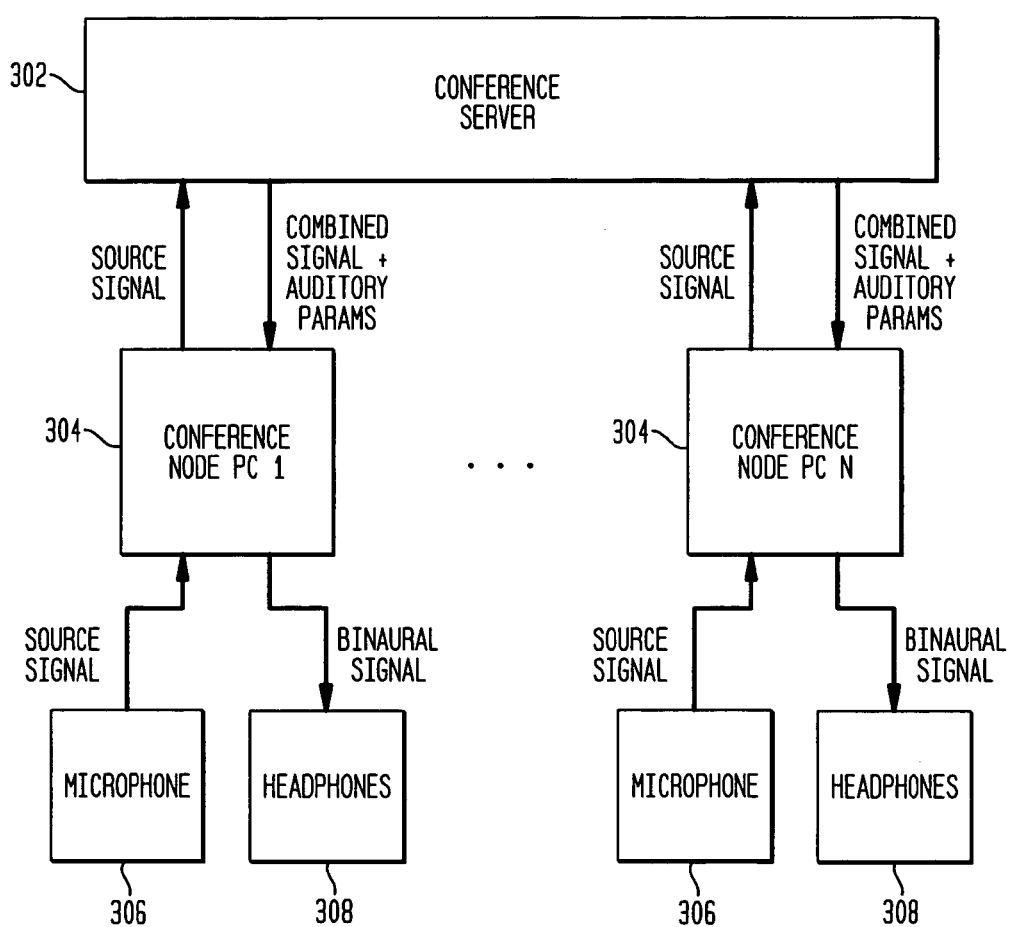
FIG. 3 shows a block diagram of a conferencing system, according to one embodiment of the present invention.

FIG. 3 shows a block diagram of a conferencing system 300, according to one embodiment of the present invention. Conferencing system 300 comprises conference server 302, which supports conferencing between a plurality of conference participants, where each participant uses a different conference node 304. In preferred embodiments of the present invention, each node 304 is a personal computer (PC) equipped with a microphone 306 and headphones 308, although other hardware configurations are also possible. Since the present invention is directed to processing of the audio portion of conferences, the following description omits reference to the processing of the video portion of such conferences, which involves the generation, manipulation, and display of video signals by video cameras, video signal processors, and digital monitors that would be included in conferencing system 300, but are not explicitly represented in FIG. 3. The present invention can also be implemented for audio-only conferencing.

As indicated in FIG. 3, each node 304 transmits a (e.g., mono) audio source signal generated by its microphone 306 to server 302, where that source signal corresponds to the corresponding participant's contribution to the conference. Server 302 combines the source signals from the different participants into a single (e.g., mono) combined audio signal and transmits that combined signal back to each node 304. (Depending on the type of echo-cancellation performed, if any, the combined signal transmitted to each node 304 may be either unique to that node or the same as the combined signal transmitted to every other node.) In addition to the combined signal, server 302 transmits an appropriate set of auditory scene parameters to each node 304. Each node 304 applies the set of auditory scene parameters to the combined signal in a manner according to the present invention to generate a binaural signal for rendering by headphones 308 and corresponding to the auditory scene for the conference.

The processing of conference server 302 may be implemented within a distinct node of conferencing system 300. Alternatively, the server processing may be implemented in one of the conference nodes 304, or even distributed among two or more different conference nodes 304.

Figure 4:
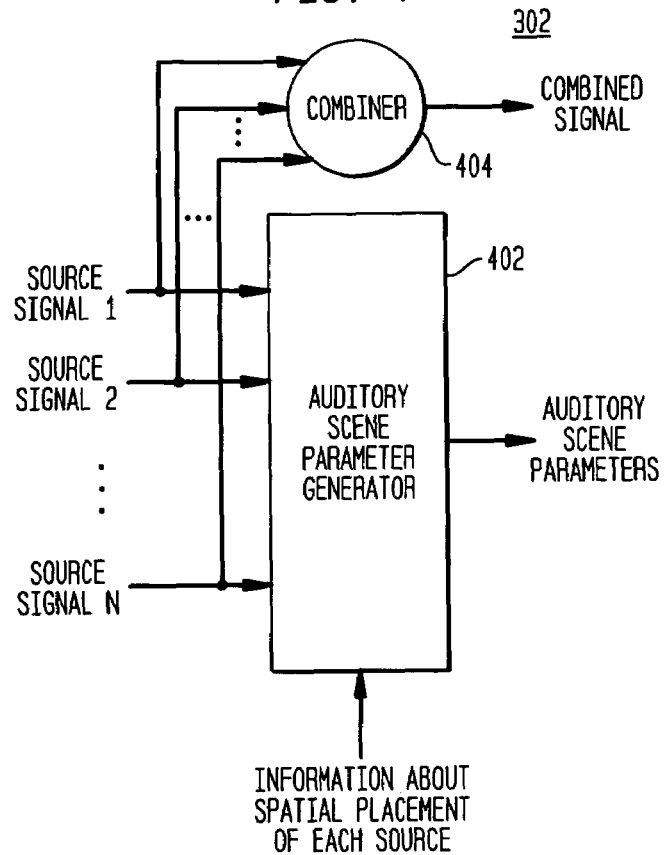
FIG. 4 shows a block diagram of the audio processing implemented by the conference server of FIG. 3, according to one embodiment of the present invention.

FIG. 4 shows a block diagram of the audio processing implemented by conference server 302 of FIG. 3, according to one embodiment of the present invention. As shown in FIG. 4, auditory scene parameter generator 402 generates one or more sets of auditory scene parameters from the plurality of source signals generated by and received from the various conference nodes 304 of FIG. 3. In addition, signal combiner 404 combines the plurality of source signals (e.g., using straightforward audio signal addition) to generate the combined signal that is transmitted back to each conference node 304.

Figure 5:
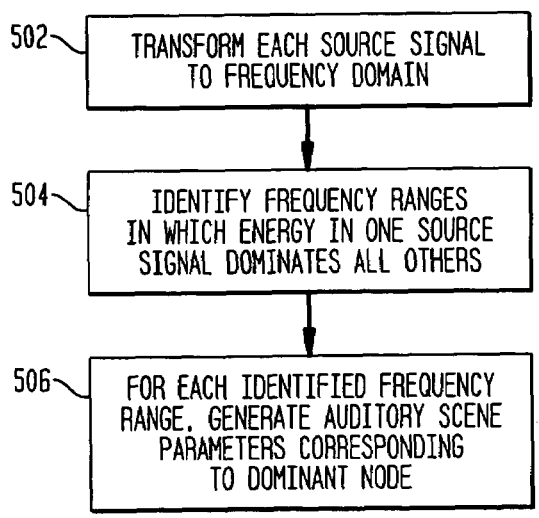
FIG. 5 shows a flow diagram of the processing implemented by the auditory scene parameter generator of FIG. 4, according to one embodiment of the present invention.

FIG. 5 shows a flow diagram of the processing implemented by auditory scene parameter generator 402 of FIG. 4, according to one embodiment of the present invention. Generator 402 applies a time-frequency (TF) transform, such as a discrete Fourier transform (DFT), to convert each node's source signal to the frequency domain (step 502 of FIG. 5). Generator 402 then compares the power spectra of the different converted source signals to identify one or more frequency bands in which the energy one of the source signals dominates all of the other signals (step 504).

Depending on the implementation, different criteria may be applied to determine whether a particular source signal dominates the other source signals. For example, a particular source signal may be said to dominate all of the other source signals when the energy of that source signal exceeds the sum of the energies in the other source signals by either a specified factor or a specified amount of power (e.g., in dBs). Alternatively, a particular source signal may be said to dominate when the energy of that source signal exceeds the second most powerful source signal by a specified factor or a specified amount of power. Other criteria are, of course, also possible, including those that combine two or more different comparisons. For example, in addition to relative domination, a source signal might have to have an absolute energy level that exceeds a specified energy level before qualifying as a dominating source signal.

Figure 6:
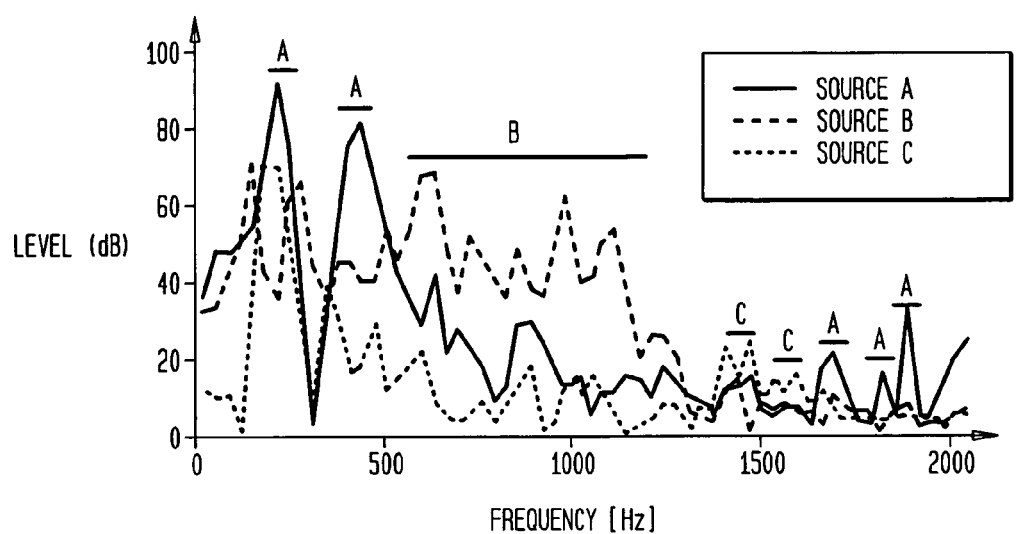
FIG. 6 shows a graphical representation of the power spectra of the audio signals from three different exemplary sources.

FIG. 6 shows a graphical representation of the power spectra of the audio signals from three different exemplary sources (labeled A, B, and C). FIG. 6 identifies eight different frequency bands in which one of the three source signals dominates the other two. Note that, in FIG. 6, there are particular frequency ranges in which none of the three source signals dominate. Note also that the lengths of the dominated frequency ranges (i.e., frequency ranges in which one of the source signals dominates) are not uniform, but rather are dictated by the characteristics of the power spectra themselves.

Returning to FIG. 5, after generator 402 identifies one or more frequency bands in which one of the source signals dominates, a set of auditory scene parameters is generated for each frequency band, where those parameters correspond to the node whose source signal dominates that frequency band (step 506). In some implementations, the processing of step 506 implemented by generator 402 generates the actual spatial parameters (e.g., ILD, ITD, and/or HRTF) for each dominated frequency band. In those cases, generator 402 receives (e.g., a priori) information about the relative spatial placement of each participant in the auditory scene to be synthesized (as indicated in FIG. 4). In addition to the combined signal, at least the following auditory scene parameters are transmitted to each conference node 304 of FIG. 3 for each dominated frequency band:
 (1) Frequency of the start of the frequency band;
 (2) Frequency of the end of the frequency band; and
 (3) One or more spatial parameters (e.g., ILD, ITD, and/or HRTF) for the frequency band.

Although the identity of the particular node/participant whose source signal dominates the frequency band can be transmitted, such information is not required for the subsequent synthesis of the auditory scene. Note that, for those frequency bands, for which no source signal is determined to dominate, no auditory scene parameters or other special information needs to be transmitted to the different conference nodes 304.

In other implementations, the generation of the spatial parameters for each dominated frequency band is implemented independently at each conference node 304. In those cases, generator 402 does not need any information about the relative spatial placements of the various participants in the synthesized auditory scene. Rather, in addition to the combined signal, only the following auditory scene parameters need to be transmitted to each conference node 304 for each dominated frequency band:
 (1) Frequency of the start of the frequency band;
 (2) Frequency of the end of the frequency band; and
 (3) Identity of the node/participant whose source signal dominates the frequency band.

In such implementations, each conference node 304 is responsible for generating the appropriate spatial parameters for each dominated frequency range. Such implementation enables each different conference node to generate a unique auditory scene (e.g., corresponding to different relative placements of the various conference participants within the synthesized auditory scene).

In either type of implementation, the processing of FIG. 5 is preferably repeated at a specified interval (e.g., once for every 20-msec frame of audio data). As a result, the number and definition of the dominated frequency ranges as well as the particular source signals that dominate those ranges will typically vary over time (e.g., from frame to frame), reflecting the fact that the set of conference participants who are speaking at any given time will vary over time as will the characteristics of their own individual voices (e.g., intonations and/or volumes). Depending on the implementation, the spatial parameters corresponding to each conference participant may be either static (e.g., for synthesis of stationary participants whose relative positions do not change over time) or dynamic (e.g., for synthesis of mobile participants who relative positions are allowed to change over time).

In alternative embodiments, rather than selecting a set of spatial parameters that corresponds to a single source, a set of spatial parameters can be generated that reflects the contributions of two or more—or even all—of the participants. For example, weighted averaging can be used to generate an ILD value that represents the relative contributions for the two or more most dominant participants. In such cases, each set of spatial parameters is a function of the relative dominance of the most dominant participants for a particular frequency band.

Figure 7:
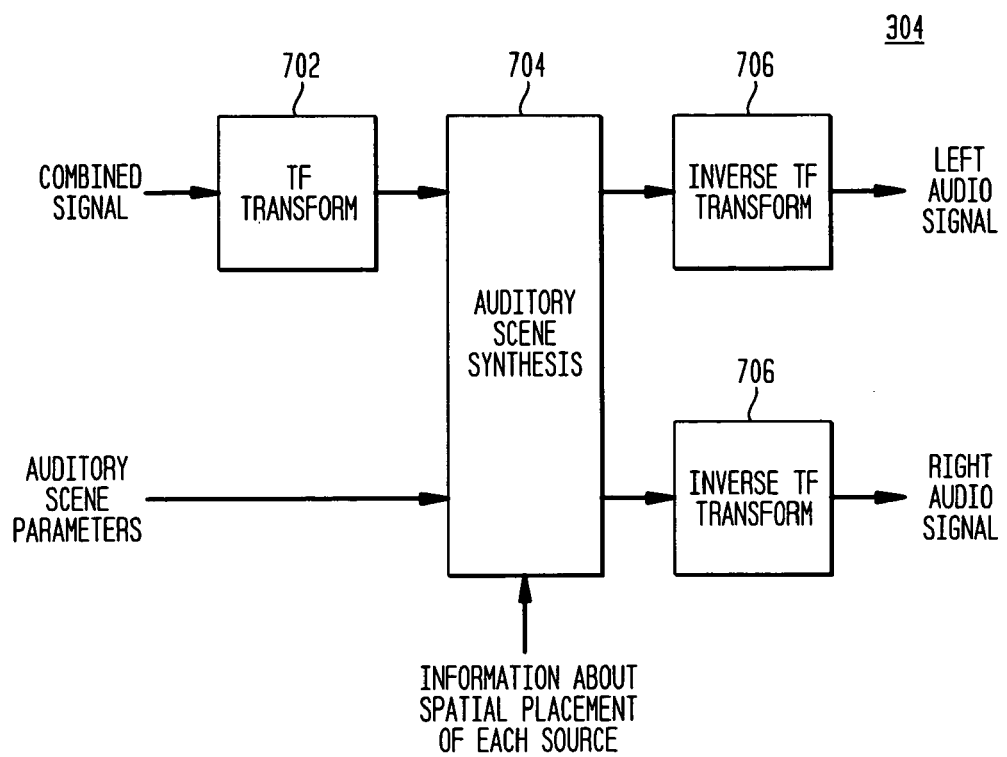
FIG. 7 shows a block diagram of the audio processing performed by each conference node in FIG. 3.

FIG. 7 shows a block diagram of the audio processing performed by each conference node 304 in FIG. 3 to convert a single combined mono audio signal and corresponding auditory scene parameters received from conference server 302 into the binaural signal for a synthesized auditory scene. In particular, time-frequency (TF) transform 702 converts each frame of the combined signal into the frequency domain.

For each dominated frequency band, auditory scene synthesizer 704 applies the corresponding auditory scene parameters to the converted combined signal to generate left and right audio signals for that frequency band in the frequency domain. In particular, for each audio frame and for each dominated frequency band, synthesizer 704 applies the set of spatial parameters corresponding to the participant whose source signal dominates the combined signal for that dominated frequency range. If the auditory scene parameters received from the conference server do not include the spatial parameters for each conference participant, then synthesizer 704 receives information about the relative spatial placement of the different participants in the synthesized auditory scene as indicated in FIG. 7, so that the set of spatial parameters for each dominated frequency band in the combined signal can be generated locally at the conference node.

An inverse TF transform 706 is then applied to each of the left and right audio signals to generate the left and right audio signals of the binaural signal in the time domain corresponding to the synthesized auditory scene. The resulting auditory scene is perceived as being approximately the same as for an ideally synthesized binaural signal with the same corresponding spatial parameters but applied over the whole spectrum of each individual source signal.

Figure 8:
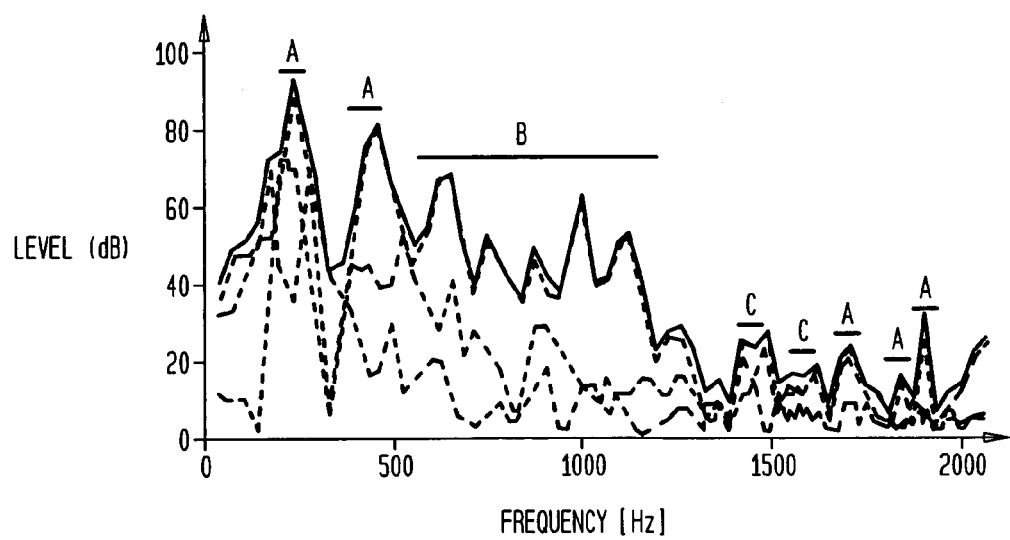
FIG. 8 shows a graphical representation of the power spectrum in the frequency domain for the combined signal generated from the three mono source signals in FIG. 6.

FIG. 8 shows a graphical representation of the power spectrum in the frequency domain for the combined signal generated from the three mono source signals from sources A, B, and C in FIG. 6. In addition to showing the three different source signals (dotted lines), FIG. 8 also shows the same frequency bands identified in FIG. 6 in which the power of one of the three source signals dominates the other two. It is to these dominated frequency bands to which auditory scene synthesizer 704 applies appropriate sets of spatial parameters.

In a typical audio frame, not all of the conference participants will dominate at least one frequency band, since not all of the participants will typically be talking at the same time. If only one participant is talking, then only that participant will typically dominate any of the frequency bands. By the same token, during an audio frame corresponding to relative silence, it may be that none of the participants will dominate any frequency bands. For those frequency bands for which no dominating participant is identified, no spatial parameters are applied and the left and right audio signals of the resulting binaural signal for those frequency bands are identical.

Time-Frequency Transform

As indicated above, TF transform 702 in FIG. 7 converts the combined mono audio signal to the spectral (i.e., frequency) domain frame-wise in order for the system to operate for real-time applications. For each frequency band n at each time k (e.g., frame number k), a level difference $\Delta L_n[k]$, a time difference $\tau_n[k]$, and/or an HRTF is to be introduced into the underlying audio signal. In a preferred embodiment, TF transform 702 is a DFT-based transform, such as those described in A. V. Oppenheim and R. W. Schaefer, *Discrete-Time Signal Processing*, Signal Processing Series, Prentice Hall, 1989, the teachings of which are incorporated herein by reference. The transform is derived based on the desire for the ability to synthesize frequency-dependent and time-adaptive time differences $\tau_n[k]$. The same transform can be used advantageously for the synthesis of frequency-dependent and time-adaptive level differences $\Delta L_n[k]$ and for HRTFs.

When W samples $s_0, \ldots, s_{W-1}$ in the time domain are converted to W samples $S_0, \ldots, S_{W-1}$ in a complex spectral domain with a DFT transform, then a circular time-shift of d time-domain samples can be obtained by modifying the W spectral values according to Equation (1) as follows:

$$\hat{S}_n = S_n e^{-\frac{2\pi n d}{W}}. \qquad (1)$$

In order to introduce a non-circular time-shift within each frame (as opposed to a circular time-shift), the time-domain samples $s_0, \ldots, s_{W-1}$ are padded with Z zeros at the beginning and at the end of the frame and a DFT of size N=2Z+W is then used. By modifying the resulting spectral coefficients, a non-circular time-shift within the range d∈[−Z,Z] can be implemented by modifying the resulting N spectral coefficients according to Equation (2) as follows:

$$\hat{S}_n = S_n e^{-\frac{2\pi n d}{N}}. \qquad (2)$$

The described scheme works as long as the time-shift d does not vary in time. Since the desired d usually varies over time, the transitions are smoothed by using overlapping windows for the analysis transform. A frame of N samples is multiplied with the analysis window before an N-point DFT is applied. The following Equation (3) shows the analysis window, which includes the zero padding at the beginning and at the end of the frame:

$$\begin{aligned} w_a[k] &= 0 & \text{for} \quad k < Z \\ w_a[k] &= \sin^2\left(\frac{(k-Z)\pi}{W}\right) & \text{for} \quad Z \le k < Z+W \\ w_a[k] &= 0 & \text{for} \quad Z+W \le k \end{aligned} \qquad (3)$$

where Z is the width of the zero region before and after the window. The non-zero window span is W, and the size of the transform is N=2Z+W.

Figure 9:
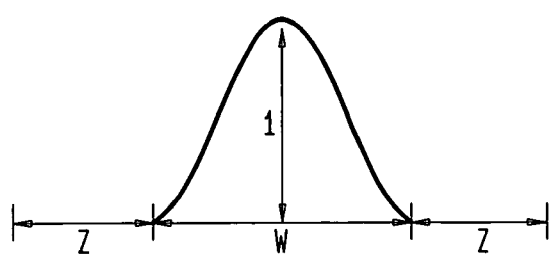
FIG. 9 shows a representation of the analysis window for the time-frequency domain, according to one embodiment of the present invention.

FIG. 9 shows a representation of the analysis window, which was chosen such that it is additive to one when windows of adjacent frames are overlapped by W/2 samples. The time-span of the window shown in FIG. 9 is shorter than the DFT length such that non-circular time-shifts within the range [−Z,Z] are possible. To gain more flexibility in changing time differences, level differences, and HRTFs in time and frequency, a higher factor of oversampling can be used by choosing the time-span of the window to be smaller and/or by overlapping the windows more.

The zero padding of the analysis window shown in FIG. 9 allows the implementation of convolutions with HRTFs as simple multiplications in the frequency domain. Therefore, the transform is also suitable for the synthesis of HRTFs in addition to time and level differences. A more general and slightly different point of view of a similar transform is given by J. B. Allen, "Short-term spectral analysis, synthesis and modification by discrete fourier transform," *IEEE Trans. on Speech and Signal Processing*, vol. ASSP-25, pp. 235–238, June 1977, the teachings of which are incorporated herein by reference.

Obtaining a Binaural Signal from a Mono Signal

In certain implementations, auditory scene synthesizer 704 of FIG. 7 applies different sets of specified level and time differences to the different dominated frequency bands in the combined signal to generate the left and right audio signals of the binaural signal for the synthesized auditory scene. In particular, for each frame k, each dominated frequency band n is associated with a level difference $\Delta L_n[k]$ and a time difference an $\tau_n[k]$. In preferred embodiments, these level and time differences are applied symmetrically to the spectrum of the combined signal to generate the spectra of the left and right audio signals according to Equations (4) and (5), respectively, as follows:

$$S_n^L = \frac{10^{\frac{\Delta L_n}{10}}}{\sqrt{1+10^{\frac{2\Delta L_n}{10}}}} S_n e^{-\frac{2\pi n \tau_n}{2N}} \quad (4)$$

and $$S_n^R = \frac{1}{\sqrt{1+10^{\frac{2\Delta L_n}{10}}}} S_n e^{\frac{2\pi n \tau_n}{2N}} \quad (5)$$

where $\{S_n\}$ are the spectral coefficients of the combined signal and $\{S_n^L\}$ and $\{S_n^R\}$ are the spectral coefficients of the resulting binaural signal. The level differences $\{\Delta L_n\}$ are expressed in dB and the time differences $\{\tau_n\}$ in numbers of samples.

For the spectral synthesis of auditory scenes based on HRTFs, the left and right spectra of the binaural signal may be obtained using Equations (6) and (7), respectively, as follows:

$$S_n^L = \sum_{m=1}^{M} w_{m,n} H_{m,n}^L S_n \quad (6)$$

and $$S_n^R = \sum_{m=1}^{M} w_{m,n} H_{m,n}^R S_n \quad (7)$$

where $H_{m,n}^L$ and $H_{m,n}^R$ are the complex frequency responses of the HRTFs corresponding to the sound source m. For each spectral coefficient, a weighted sum of the frequency responses of the HRTFs of all sources is applied with weights $w_{m,n}$. The level differences $\Delta L_n$, time differences $\tau_n$, and HRTF weights $w_{m,n}$ are preferably smoothed in frequency and time to prevent artifacts.

Experimental Results

To evaluate how useful the present invention is for a desktop conferencing application, twelve participants were given a task which required responding to one of two simultaneous voice messages. This is a variation of the "cocktail party problem" of attending to one voice in the presence of others. The signals were presented to the participants with headphones in an acoustically isolated room. Five different signal kinds were tested for their effect on the ability to respond to one of two simultaneous messages:

Test 1: diotic: a mono signal to both ears
Test 2: $ILD_i$: an ideally synthesized binaural signal with ILDs
Test 3: $ITD_i$: an ideally synthesized binaural signal with ITDs
Test 4: $ILD_p$: a binaural signal perceptually synthesized with ILDs using the present invention
Test 5: $ITD_p$: a binaural signal perceptually synthesized with ITDs using the present invention Each of the participants took all of the tests in randomized order.

The tests used the speech corpus introduced in R. S. Bolia, W. T. Nelson, M. A. Ericson, and B. D. Simpson, "A speech corpus for multitalker communications research," *J. Acoust. Soc. Am.*, vol. 107, no. 2, pp. 1065–1066, February 2000, the teachings of which are incorporated herein by reference. Similar tests have also been conducted by others, such as reported in R. S. Bolia, M. A. Ericson, W. T. McKinley, and B. D. Simpson, "A cocktail party effect in the median plane?," *J. Acoust. Soc. Am.*, vol. 105, pp. 1390–1391, 1999, and W. Spieth, J. F. Curtis, and J. C. Webster, "Responding to one of two simultaneous messages," *J. Acoust. Soc. Am.*, vol. 26, no. 3, pp. 391–396, 1954, the teachings of both of which are incorporated herein by reference.

A typical sentence of the corpus is "READY LAKER, GO TO BLUE FIVE NOW," where LAKER is the call sign and BLUE FIVE is a color-number combination. Combinations of the eight different call signs, four different colors, and eight different numbers were chosen randomly with the restriction that the call sign assigned to the participant occurred in 50% of the cases.

In the tests, each participant was instructed to respond when his or her call sign was called by indicating the color-number combination by the talker who called the call sign. One out of four female talkers was randomly chosen for each of the two talkers in each test item. One talker was spatially placed at the right side and the other at the left side for Tests 2 and 4 (ILD=±16 dB) and for Tests 3 and 5 (ITD=±500 μsec). Each of the five tests consisted of 20 test items which were preceded by 10 training items.

Table I shows the results for the case when the listeners were called by their call signs. The upper row shows the percentage of correct identification of the call sign, and the lower row shows the conditional percentage of the correct color-number combination given that the listener's call sign was correctly identified. These results suggest that the percentages of correct identification of the call sign and of the color and number significantly improve for ideally synthesized binaural signals (Tests 2 and 3) or perceptually synthesized binaural signals (Tests 4 and 5) over the diotic signal (Test 1), with the perceptually synthesized signals of Tests 4 and 5 being almost as good as the ideally synthesized signals of Tests 2 and 3. For the cases when the listeners were not called, the percentages of the listeners responding was below two percent for all five tests.

TABLE I

|  | Test 1 | Test 2 | Test 3 | Test 4 | Test 5 |
| --- | --- | --- | --- | --- | --- |
| call sign | 70% | 78% | 85% | 77% | 78% |
| color-number | 64% | 98% | 88% | 96% | 91% |

Alternative Embodiments

In the previous sections, the present invention was described in the context of a desktop conferencing application. The present invention can also be employed for other applications. For example, the present invention can be applied where the input is a binaural signal corresponding to an (actual or synthesized) auditory scene, rather than the input being individual mono source signals as in the previous application. In this latter application, the binaural signal is converted into a single mono signal and auditory scene parameters (e.g., sets of spatial parameters). As in the desktop conferencing application, this application of the present invention can be used to reduce the transmission bandwidth requirements for the auditory scene since, instead of having to transmit the individual left and right audio signals for the binaural signal, only a single mono signal plus the relatively small amount of spatial parameter information need to be transmitted to a receiver, where the receiver performs processing similar to that shown in FIG. 7.

Figure 10:
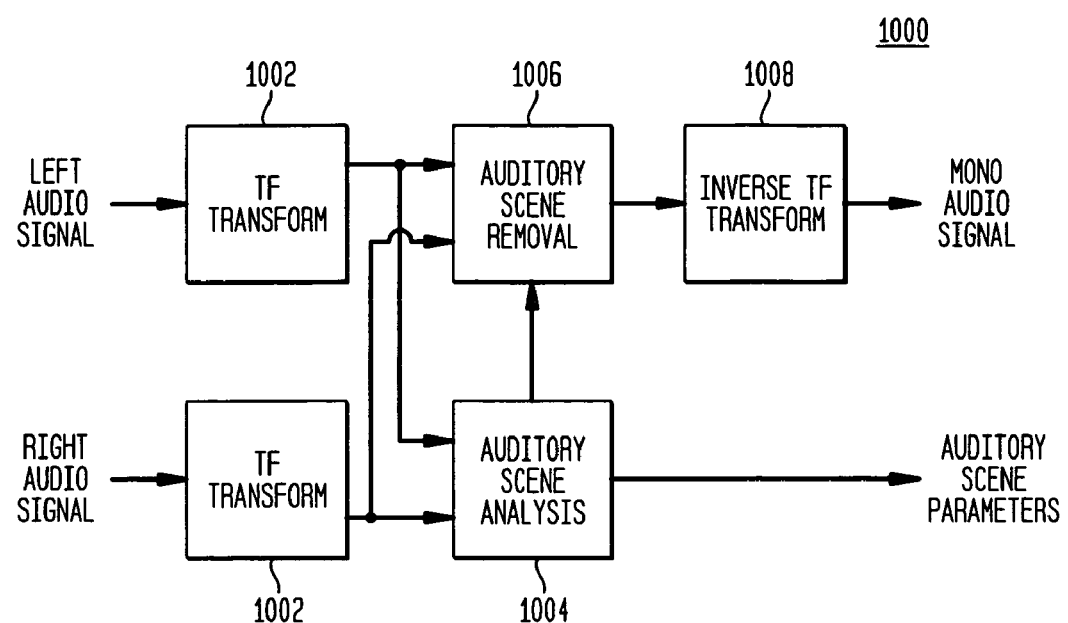
FIG. 10 shows a block diagram of the transmitter for an alternative application of the present invention, according to one embodiment of the present invention.

FIG. 10 shows a block diagram of transmitter 1000 for such an application, according to one embodiment of the present invention. As shown in FIG. 10, a TF transform 1002 is applied to corresponding frames of each of the left and right audio signals of the input binaural signal to convert the signals to the frequency domain. Auditory scene analyzer 1004 processes the converted left and right audio signals in the frequency domain to generate a set of auditory scene parameters for each of a plurality of different frequency bands in those converted signals. In particular, for each corresponding pair of audio frames, analyzer 1004 divides the converted left and right audio signals into a plurality of frequency bands. Depending on the implementation, each of the left and right audio signals can be divided into the same number of equally sized frequency bands. Alternatively, the size of the frequency bands may vary with frequency, e.g., larger frequency bands for higher frequencies or smaller frequency bands for higher frequencies.

For each corresponding pair of frequency bands, analyzer 1004 compares the converted left and right audio signals to generate one or more spatial parameters (e.g., an ILD value, an ITD value, and/or an HRTF). In particular, for each frequency band, the cross-correlation between the converted left and right audio signals is estimated. The maximum value of the cross-correlation, which indicates how much the two signals are correlated, can be used as a measure for the dominance of one source in the band. If there is 100% correlation between the left and right audio signals, then only one source's energy is dominant in that frequency band. The less the cross-correlation maximum is, the less is just one source dominant. The location in time of the maximum of the cross-correlation can be used to correspond to the ITD. The ILD can be obtained by computing the level difference of the power spectral values of the left and right audio signals. In this way, each set of spatial parameters is generated by treating the corresponding frequency range as if it were dominated by a single source signal. For those frequency bands where this assumption is true, the generated set of spatial parameters will be fairly accurate. For those frequency bands where this assumption is not true, the generated set of spatial parameters will have less physical significance to the actual auditory scene. On the other hand, the assumption is that those frequency bands contribute less significantly to the overall perception of the auditory scene. As such, the application of such "less significant" spatial parameters will have little if any adverse affect on the resulting auditory scene. In any case, transmitter 1000 transmits these auditory scene parameters to the receiver for use in reconstructing the auditory scene from the mono audio signal.

Auditory scene remover 1006 combines the converted left and right audio signals in the frequency domain to generate the mono audio signal. In a basic implementation, remover 1006 simply averages the left and right audio signals. In preferred implementations, however, more sophisticated processing is performed to generate the mono signal. In particular, for example, the spatial parameters generated by auditory scene analyzer 1004 can be used to modify both the left and right audio signals in the frequency domain as part of the process of generating the mono signal, where each different set of spatial parameters is used to modify a corresponding frequency band in each of the left and right audio signals. For example, if the generated spatial parameters include an ITD value for each frequency band, then the left and right audio signals in each frequency band can be appropriately time shifted using the corresponding ITD value to make the ITD between the left and right audio signals become zero. The power spectra for the time-shifted left and right audio signals can then be added such that the perceived loudness of each frequency band is the same in the resulting mono signal as in the original binaural signal.

An inverse TF transform 1008 is then applied to the resulting mono audio signal in the frequency domain to generate the mono audio signal in the time domain. The mono audio signal can then be compressed and/or otherwise processed for transmission to the receiver. Since a receiver having a configuration similar to that in FIG. 7 converts the mono audio signal back into the frequency domain, the possibility exists for omitting inverse TF transform 1008 of FIG. 10 and TF transform 702 of FIG. 7, where the transmitter transmits the mono audio signal to the receiver in the frequency domain.

As in the previous application, the receiver applies the received auditory scene parameters to the received mono audio signal to synthesize (or, in this latter case, reconstruct an approximation of) the auditory scene. Note that, in this latter application, there is no need for any a priori knowledge of either the number of sources involved in the original auditory scene or their relative positions. In this latter application, there is no identification of particular sources with particular frequency bands. Rather, the frequency bands are selected in an open-loop manner, but processed with the same underlying assumption as the previous application: that is, that each frequency band can be treated as if it corresponded to a single source using a corresponding set of spatial parameters.

Although this latter application has been described in the context of processing in which the input is a binaural signals, this application of the present invention can be extended to (two or multi-channel) stereo signals. Similarly, although the invention has been described in the context of systems that generate binaural signals corresponding to auditory scenes perceived using headphones, the present invention can be extended to apply to the generation of (two or multi-channel) stereo signals for loudspeaker playback.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for synthesizing an auditory scene, comprising the steps of:
   (a) dividing an input audio signal into a plurality of different frequency bands; and
   (b) applying two or more different sets of one or more spatial parameters to two or more of the different frequency bands in the input audio signal to generate two or more synthesized audio signals of the auditory scene, wherein, for at least one of the sets of one or more spatial parameters, at least one of the spatial parameters corresponds to a combination of two or more different audio sources in the auditory scene that takes into account relative dominance of the two or more different audio sources in the auditory scene.

2. The invention of claim 1, wherein:
   the input audio signal corresponds to a combination of audio signals from two or more different audio sources; and
   each set of one or more spatial parameters corresponds to a different audio source in the auditory scene.

3. The invention of claim 1, wherein the input audio signal is a mono signal.

4. The invention of claim 1, wherein the input audio signal corresponds to a combination of two or more different source signals, wherein the two or more different frequency bands are selected by comparing magnitudes of the two or more different source signals, wherein, for each of the two or more different frequency bands, one of the source signals dominates the other source signals.

5. The invention of claim 1, wherein the input audio signal corresponds to a combination of left and right audio signals, wherein each different set of one or more spatial parameters is generated by comparing the left and right audio signals in a corresponding frequency band.

6. The invention of claim 1, wherein step (a) comprises the step of dividing the input audio signal into the plurality of different frequency bands based on information corresponding to the different sets of one or more spatial parameters.

7. The invention of claim 1, wherein:
   the input audio signal corresponds to a combination of audio signals from two or more different audio sources; and
   each set of one or more spatial parameters is applied to at least one frequency band in which the input audio signal is dominated by a corresponding audio source in the auditory scene.

8. The invention of claim 1, wherein each set of one or more spatial parameters comprises one or more of an interaural level difference, an interaural time delay, and a head-related transfer function.

9. The invention of claim 1, wherein:
   step (a) further comprises the step of converting the input audio signal from a time domain into a frequency domain; and
   step (b) further comprises the step of converting the two or more synthesized audio signals from the frequency domain into the time domain.

10. The invention of claim 1, wherein the two or more synthesized audio signals comprise left and right audio signals corresponding to the auditory scene.

11. The invention of claim 1, wherein the two or more synthesized audio signals comprise three or more signals of a multi-channel audio signal corresponding to the auditory scene.

12. The invention of claim 1, wherein, for each of the two or more different frequency bands, the corresponding set of one or more spatial parameters is applied to the input audio signal as if the input audio signal corresponded to a single audio source in the auditory scene.

13. The invention of claim 1, wherein the input audio signal corresponds to a combination of three or more audio signals of a multi-channel signal, wherein each different set of one or more spatial parameters is generated by comparing at least two of the audio signals in a corresponding frequency band.

14. The invention of claim 1, further comprising decompressing a compressed audio signal to generate the input audio signal.

15. The invention of claim 1, wherein:
   the input audio signal is a mono signal;
   each set of one or more spatial parameters corresponds to a different audio source in the auditory scene;
   step (a) comprises the steps of:
      (1) converting the mono signal from a time domain into a frequency domain;
      (2) dividing the converted mono signal into the plurality of different frequency bands based on information corresponding to the sets of one or more spatial parameters;
   each set of one or more spatial parameters is applied to at least one frequency band in which the input audio signal is dominated by a corresponding audio source in the auditory scene;
   each set of one or more spatial parameters comprises one or more of an interaural level difference, an interaural time delay, and a head-related transfer function;
   the two or more synthesized audio signals comprise left and right audio signals corresponding to the auditory scene; and
   step (b) further comprises the step of converting the left and right audio signals from the frequency domain into the time domain.

16. The invention of claim 15, wherein the mono signal corresponds to a combination of two or more different mono source signals, wherein the two or more different frequency bands are selected by comparing magnitudes of the two or more different mono source signals, wherein, for each of the two or more different frequency bands, one of the mono source signals dominates the other mono source signals.

17. The invention of claim 15, wherein the mono signal corresponds to a combination of left and right audio signals, wherein each different set of one or more spatial parameters is generated by comparing the left and right audio signals in a corresponding frequency band.

18. A machine-readable medium, having encoded thereon program code, wherein, when the program code is executed by a machine, the machine implements a method for synthesizing an auditory scene, comprising the steps of:
  (a) dividing an input audio signal into a plurality of different frequency bands; and
  (b) applying two or more different sets of one or more spatial parameters to two or more of the different frequency bands in the input audio signal to generate two or more synthesized audio signals of the auditory scene, wherein, for at least one of the sets of one or more spatial parameters, at least one of the spatial parameters corresponds to a combination of two or more different audio sources in the auditory scene that takes into account relative dominance of the two or more different audio sources in the auditory scene.

19. An apparatus for synthesizing an auditory scene, comprising:
  (a) means for dividing an input audio signal into a plurality of different frequency bands; and
  (b) means for applying two or more different sets of one or more spatial parameters to two or more of the different frequency bands in the input audio signal to generate two or more synthesized audio signals of the auditory scene, wherein, for at least one of the sets of one or more spatial parameters, at least one of the spatial parameters corresponds to a combination of two or more different audio sources in the auditory scene that takes into account relative dominance of the two or more different audio sources in the auditory scene.

20. An apparatus for synthesizing an auditory scene, comprising:
  (1) an auditory scene synthesizer configured to:
    (a) divide an input audio signal into a plurality of different frequency bands; and
    (b) apply two or more different sets of one or more spatial parameters to two or more of the different frequency bands in the input audio signal to generate two or more synthesized audio signals of the auditory scene; and
  (2) one or more inverse time-frequency transformers configured to convert the two or more synthesized audio signals from a frequency domain into a time domain, wherein, for at least one of the sets of one or more spatial parameters, at least one of the spatial parameters corresponds to a combination of two or more different audio sources in the auditory scene that takes into account relative dominance of the two or more different audio sources in the auditory scene.

21. A method for processing two or more input audio signals, comprising the steps of:
  (a) converting the two or more input audio signals from a time domain into a frequency domain;
  (b) generating a set of one or more auditory scene parameters for each of two or more different frequency bands in the two or more converted input audio signals; and
  (c) combining the two or more input audio signals to generate a combined audio signal, wherein, for at least one of the sets of one or more spatial parameters, at least one of the spatial parameters corresponds to a combination of two or more different audio sources in an auditory scene that takes into account relative dominance of the two or more different audio sources in the auditory scene.

22. The invention of claim 21, wherein:
  the two or more input audio signals are mono signals corresponding to different audio sources in the auditory scene;
  each set of one or more auditory scene parameters corresponds to an audio source that dominates the other audio sources in the corresponding frequency band; and
  the two or more input audio signals are combined in the time domain to generate the combined audio signal.

23. The invention of claim 21, wherein:
  the two or more input audio signals are left and right audio signals;
  each set of one or more auditory scene parameters is generated by comparing the left and right audio signals in the corresponding frequency band; and
  further comprising the step of converting the combined audio signal from the frequency domain into the time domain.

24. The invention of claim 21, wherein each set of one or more auditory scene parameters is generated as if the corresponding frequency band corresponded to a single audio source in an auditory scene.

25. The invention of claim 21, wherein:
  the two or more input audio signals are three or more audio signals of a multi-channel signal; and
  each set of one or more auditory scene parameters is generated by comparing at least two of the audio signals in the corresponding frequency band.

26. The invention of claim 21, further comprising compressing the combined audio signal to generate a compressed audio signal.

27. The invention of claim 21, wherein the combined audio signal is generated by performing auditory scene removal on the input audio signals in the frequency domain based on the two or more sets of one or more auditory scene parameters.

28. The invention of claim 21, wherein the combined audio signal is generated by averaging the input audio signals.

29. A machine-readable medium, having encoded thereon program code, wherein, when the program code is executed by a machine, the machine implements a method for processing two or more input audio signals, comprising the steps of:
  (a) converting the two or more input audio signals from a time domain into a frequency domain;
  (b) generating a set of one or more auditory scene parameters for each of two or more different frequency bands in the two or more converted input audio signals; and
  (c) combining the two or more input audio signals to generate a combined audio signal, wherein, for at least one of the sets of one or more spatial parameters, at least one of the spatial parameters corresponds to a combination of two or more different audio sources in an auditory scene that takes into account relative dominance of the two or more different audio sources in the auditory scene.

30. An apparatus for processing two or more input audio signals, comprising:
  (a) means for converting the two or more input audio signals from a time domain into a frequency domain;
  (b) means for generating a set of one or more auditory scene parameters for each of two or more different frequency bands in the two or more converted input audio signals; and (c) means for combining the two or more input audio signals to generate a combined audio signal, wherein, for at least one of the sets of one or more spatial parameters, at least one of the spatial parameters corresponds to a combination of two or more different audio sources in an auditory scene that takes into account relative dominance of the two or more different audio sources in the auditory scene.

31. An apparatus for processing two or more input audio signals, comprising:
    (a) a time-frequency transformer configured to convert the two or more input audio signals from a time domain into a frequency domain;
    (b) an auditory scene parameter generator configured to generate a set of one or more auditory scene parameters for each of two or more different frequency bands in the two or more converted input audio signals; and
    (c) a combiner configured to combine the two or more input audio signals to generate a combined audio signal, wherein, for at least one of the sets of one or more spatial parameters, at least one of the spatial parameters corresponds to a combination of two or more different audio sources in an auditory scene that takes into account relative dominance of the two or more different audio sources in the auditory scene.

32. The invention of claim 31, wherein:
    the two or more input audio signals are mono signals corresponding to different audio sources in the auditory scene;
    each set of one or more auditory scene parameters corresponds to an audio source that dominates the other audio sources in the corresponding frequency band; and
    the combiner operates in the time domain.

33. The invention of claim 31, wherein:
    the two or more input audio signals are left and right audio signals;
    each set of one or more auditory scene parameters is generated by comparing the left and right audio signals in the corresponding frequency band; and
    further comprising an inverse time-frequency transformer configured to convert the combined audio signal from the frequency domain into the time domain.

34. A bitstream comprising a combined audio signal and a plurality of auditory scene parameters, wherein:
    the combined audio signal is generated by combining two or more input audio signals; and
    the auditory scene parameters are generated by:
        converting the two or more input audio signals from a time domain into a frequency domain; and
        generating a set of one or more auditory scene parameters for each of two or more different frequency bands in the two or more converted input audio signals, wherein, for at least one of the sets of one or more spatial parameters, at least one of the spatial parameters corresponds to a combination of two or more different audio sources in an auditory scene that takes into account relative dominance of the two or more different audio sources in the auditory scene.

35. A method for synthesizing an auditory scene, comprising the steps of:
    (a) dividing an input audio signal into a plurality of different frequency bands; and
    (b) applying two or more different sets of one or more spatial parameters to two or more of the different frequency bands in the input audio signal to generate two or more synthesized audio signals of the auditory scene, wherein the input audio signal corresponds to a combination of two or more different source signals, wherein the two or more different frequency bands are selected by comparing magnitudes of the two or more different source signals, wherein, for each of the two or more different frequency bands, one of the source signals dominates the other source signals.

36. A method for synthesizing an auditory scene, comprising the steps of:
    (a) dividing an input audio signal into a plurality of different frequency bands; and
    (b) applying two or more different sets of one or more spatial parameters to two or more of the different frequency bands in the input audio signal to generate two or more synthesized audio signals of the auditory scene, wherein the input audio signal corresponds to a combination of left and right audio signals, wherein each different set of one or more spatial parameters is generated by comparing the left and right audio signals in a corresponding frequency band.

37. A method for synthesizing an auditory scene, comprising the steps of:
    (a) dividing an input audio signal into a plurality of different frequency bands; and
    (b) applying two or more different sets of one or more spatial parameters to two or more of the different frequency bands in the input audio signal to generate two or more synthesized audio signals of the auditory scene, wherein:
    the input audio signal corresponds to a combination of audio signals from two or more different audio sources; and
    each set of one or more spatial parameters is applied to at least one frequency band in which the input audio signal is dominated by a corresponding audio source in the auditory scene.

38. The invention of claim 37, wherein:
    the input audio signal is a mono signal;
    each set of one or more spatial parameters corresponds to a different audio source in the auditory scene;
    step (a) comprises the steps of:
        (1) converting the mono signal from a time domain into a frequency domain;
        (2) dividing the converted mono signal into the plurality of different frequency bands based on information corresponding to the sets of one or more spatial parameters;
    each set of one or more spatial parameters comprises one or more of an interaural level difference, an interaural time delay, and a head-related transfer function;
    the two or more synthesized audio signals comprise left and right audio signals corresponding to the auditory scene; and
    step (b) further comprises the step of converting the left and right audio signals from the frequency domain into the time domain.

39. The invention of claim 38, wherein the mono signal corresponds to a combination of two or more different mono source signals, wherein the two or more different frequency bands are selected by comparing magnitudes of the two or more different mono source signals, wherein, for each of the two or more different frequency bands, one of the mono source signals dominates the other mono source signals.

40. The invention of claim 38, wherein the mono signal corresponds to a combination of left and right audio signals, wherein each different set of one or more spatial parameters is generated by comparing the left and right audio signals in a corresponding frequency band.

41. A method for synthesizing an auditory scene, comprising the steps of:
(a) dividing an input audio signal into a plurality of different frequency bands; and
(b) applying two or more different sets of one or more spatial parameters to two or more of the different frequency bands in the input audio signal to generate two or more synthesized audio signals of the auditory scene, wherein the input audio signal corresponds to a combination of three or more audio signals of a multi-channel signal, wherein each different set of one or more spatial parameters is generated by comparing at least two of the audio signals in a corresponding frequency band.

42. A method for processing two or more input audio signals, comprising the steps of:
(a) converting the two or more input audio signals from a time domain into a frequency domain;
(b) generating a set of one or more auditory scene parameters for each of two or more different frequency bands in the two or more converted input audio signals; and
(c) combining the two or more input audio signals to generate a combined audio signal, wherein:
the two or more input audio signals are mono signals corresponding to different audio sources in the auditory scene;
each set of one or more auditory scene parameters corresponds to an audio source that dominates the other audio sources in the corresponding frequency band; and
the two or more input audio signals are combined in the time domain to generate the combined audio signal.

43. A method for processing two or more input audio signals, comprising the steps of:
(a) converting the two or more input audio signals from a time domain into a frequency domain;
(b) generating a set of one or more auditory scene parameters for each of two or more different frequency bands in the two or more converted input audio signals; and
(c) combining the two or more input audio signals to generate a combined audio signal, wherein:
the two or more input audio signals are left and right audio signals;
each set of one or more auditory scene parameters is generated by comparing the left and right audio signals in the corresponding frequency band; and
further comprising the step of converting the combined audio signal from the frequency domain into the time domain.

44. A method for processing two or more input audio signals, comprising the steps of:
(a) converting the two or more input audio signals from a time domain into a frequency domain;
(b) generating a set of one or more auditory scene parameters for each of two or more different frequency bands in the two or more converted input audio signals; and
(c) combining the two or more input audio signals to generate a combined audio signal, wherein:
the two or more input audio signals are three or more audio signals of a multi-channel signal; and
each set of one or more auditory scene parameters is generated by comparing at least two of the audio signals in the corresponding frequency band.

45. A method for processing two or more input audio signals, comprising the steps of:
(a) converting the two or more input audio signals from a time domain into a frequency domain;
(b) generating a set of one or more auditory scene parameters for each of two or more different frequency bands in the two or more converted input audio signals; and
(c) combining the two or more input audio signals to generate a combined audio signal, wherein the combined audio signal is generated by performing auditory scene removal on the input audio signals in the frequency domain based on the two or more sets of one or more auditory scene parameters.

46. A method for processing two or more input audio signals, comprising the steps of:
(a) converting the two or more input audio signals from a time domain into a frequency domain;
(b) generating a set of one or more auditory scene parameters for each of two or more different frequency bands in the two or more converted input audio signals; and
(c) combining the two or more input audio signals to generate a combined audio signal, wherein the combined audio signal is generated by averaging the input audio signals.

47. An apparatus for processing two or more input audio signals, comprising:
(a) a time-frequency transformer configured to convert the two or more input audio signals from a time domain into a frequency domain;
(b) an auditory scene parameter generator configured to generate a set of one or more auditory scene parameters for each of two or more different frequency bands in the two or more converted input audio signals; and
(c) a combiner configured to combine the two or more input audio signals to generate a combined audio signal, wherein:
the two or more input audio signals are mono signals corresponding to different audio sources in the auditory scene;
each set of one or more auditory scene parameters corresponds to an audio source that dominates the other audio sources in the corresponding frequency band; and
the combiner operates in the time domain.

48. An apparatus for processing two or more input audio signals, comprising:
(a) a time-frequency transformer configured to convert the two or more input audio signals from a time domain into a frequency domain;
(b) an auditory scene parameter generator configured to generate a set of one or more auditory scene parameters for each of two or more different frequency bands in the two or more converted input audio signals; and
(c) a combiner configured to combine the two or more input audio signals to generate a combined audio signal, wherein:
the two or more input audio signals are left and right audio signals;
each set of one or more auditory scene parameters is generated by comparing the left and right audio signals in the corresponding frequency band; and
further comprising an inverse time-frequency transformer configured to convert the combined audio signal from the frequency domain into the time domain.

* * * * *